United States Patent [19]

Handwerk et al.

[11] 4,452,750

[45] Jun. 5, 1984

[54] LOW ENERGY PROCESSING OF THERMOPLASTIC POLYMERS

[75] Inventors: Richard H. Handwerk, South Somerville, N.J.; Alfred Mendelsohn, Brooklyn, N.Y.; Urho S. Haapala, Middlesex, N.J.

[73] Assignee: Union Carbide Corporation, Danbury, Conn.

[21] Appl. No.: 483,850

[22] Filed: Apr. 18, 1983

Related U.S. Application Data

[63] Continuation of Ser. No. 262,942, May 12, 1981, abandoned.

[51] Int. Cl.³ .............................................. B29C 3/02
[52] U.S. Cl. .................................. 264/40.3; 264/40.7; 264/142; 264/349; 425/144
[58] Field of Search ................... 264/40.3, 40.7, 144, 264/145, 161, 176, 340; 425/144

[56] References Cited

U.S. PATENT DOCUMENTS

| | | | |
|---|---|---|---|
| 3,130,448 | 4/1964 | Tomlinson | 264/176 F |
| 3,474,773 | 10/1969 | Briguac et al. | 264/176 F |
| 3,737,506 | 6/1973 | Martin et al. | 264/176 F |
| 4,032,391 | 6/1977 | Moked et al. | 418/206 |
| 4,137,023 | 1/1979 | Moked et al. | 418/206 |

FOREIGN PATENT DOCUMENTS

| | | | |
|---|---|---|---|
| 1364725 | 8/1974 | United Kingdom | 425/144 |
| 407292 | 4/1974 | U.S.S.R. | 425/144 |

Primary Examiner—Jay H. Woo
Attorney, Agent, or Firm—Gerald R. O'Brien

[57] ABSTRACT

In the operation of a melter/mixer-gear pump system for processing of synthetic thermoplastic materials, the improvement is disclosed which comprises employing the pressure between the melter/mixer and the gear pump as the controlling parameter which affects, in a proportional relationship, the speed of the gear pump, the energy transmitted to and the consequent temperature of the materials passing through said melter/mixer.

4 Claims, 4 Drawing Figures

LOW ENERGY PROCESSING OF THERMOPLASTIC POLYMERS

This application is a continuation of application Ser. No. 262,942, filed 5/12/81, abandoned.

The present invention relates to a low energy system for the processing of synthetic thermoplastic materials. Such processing involves, by way of example, the compounding of thermoplastic polymers with additives, fillers and the like, pelletizing of thermoplastic polymers, and similar processing applications of this type.

It is desirable to reduce the energy imparted by a processing system to materials such as thermoplastic polymers for many reasons, aside from cost savings, such as to avoid the thermal abuse of these materials by passage through the processing system.

One aspect of the present invention consists in replacing the conventional screw extruder by a gear pump for performing the pumping function in such a processing system. The mere combination of a conventional melter/mixer with a gear pump to carry out compounding or other fabricating operations with thermoplastic elements is neither novel nor an aspect of the present invention. U.S. Pat. Nos. 4,032,391 and 4,137,023 to I. Moked et al relate to a gear pump and a low energy pumping system (LEPSY) and suggest such combination of melter/mixer (such as a Farrel continuous mixer - FCM and such gear pump in an in-line processing system.

The parent invention employs a melter/mixer to perform the melting and mixing operations without imparting any significant extruder-like high energy to the thermoplastic material being melted and mixed.

Accordingly, a gear pump is "close coupled" (as hereinafter defined) to a continuous melter/mixer of conventional design with the exception that the discharge of the melter/mixer is modified for coupling of the gear pump. Furthermore, the melter/mixer is not required to have a flow restrictor or "gate" for controlling of energy input to the melter/mixer. It has been found that varying the gear pump speed is a very effective means of controlling energy input to the melter/mixer, much more so than conventional systems.

The throughput rate of material in the melter/mixer-gear pump system is an independent variable with respect to the internal system and is externally controlled from and by a source such as the input feeder to the system. While the melter/mixer-gear pump processing capacity must be suitably sized to the design throughput rates, the purpose of the gear pump is to pump molten polymer material and to control the energy input to the polymer by the melter/mixer as described below. The speed of the gear pump is controlled by the pressure of the polymer in the hydraulically-filled transition member positioned between the melter/mixer and the gear pump.

In accordance with the present invention, an in-line melter/mixer-gear pump system is provided for the processing of synthetic thermoplastic materials which comprises employing the pressure between the melter/mixer and the gear pump as the controlling parameter which affects, in a proportional relationship, the speed of the gear pump, the energy transmitted to and the consequent temperature of the materials passing through the said melter/mixer.

In selecting a melter/mixer and melt pump combination for the low energy processing system of the invention, it is to be noted that downstream equipment will affect the required discharge pressure of the gear pump while the pumping capacity of the gear pump, as well as the melter/mixer and downstream equipment, is determind by the external polymer inlet feed source referred to above. Such selection of a suitable melt pump will leave to the melter/mixer all of the melting and mixing requirements of the system. In this sense, it is preferred that the melter/mixer be "closely coupled" to the melt pump so that it feeds to the melt pump inlet exactly the throughput and pressure-matched demands of the melt pump. The passage of lesser amounts of molten material will cause undesirable results from "starvation rate feeding" (negating the function of the gear pump to control energy input by the melter-mixer due to loss of the pressure control of the gear pump rotational speed) and the passage of amounts exceeding this will result in undesirable backlogging and backflow of melt material to the upstream end of the melter/mixer.

Accordingly, the melter/mixer parameters and differential rotation speeds of the melter/mixer and gear pump (as measured by pressure transducer control means positioned in the adapter section) are preferably so selected to achieve a gear pump output rate matching the throughput rate of the melter/mixer and associated system. The accomplishment of this "close coupling" matching produces a lower energy operation of the melter/mixer-gear-pump from that required in or encountered in the prior art, thereby permitting low temperature melter/mixer-gear pump operation (low energy) and assuring that the system combination of melter/mixer and gear pump provides the required system at a far lower level of energy consumption than is otherwise attainable in conventional systems.

It has been found that the two aspects of achieving "close coupling" are: minimizing the length of the conduit connections between the melter/mixer and the gear pump; and employing hydraulically (polymer) filled and pressurized communication between the melter/mixer and the gear pump.

The system of the present invention has been carried out employing both single-stage compounding melter-mixers as well as two-stage compounding melter/mixers with both high pressure and low pressure polyethylene as the thermoplastic polymer material. It has been found that processing and product quality advantages in the materials processed in accordance with the present invention are as follows.

(a) Absence of Oxygen—It is to be pointed out that the effect of oxygen at treatment temperature in the process of the present invention results in oxidation of the synthetic thermoplastic polymer material being treated and produces all of the adverse effects well known to the art which are caused by such oxidation. Therefore, it must be noted that treatment in accordance with the process of the invention requires close coupling throughout the entire system, from the point at the output end of any reactor employed for polymerization in the process, to the point of final handling of the synthetic thermoplastic polymer material at process temperatures.

Close coupling (rather than open hopper inlet feed) to the polymerization reactor outlet also enables a reduction in energy input to the melter-mixer due to the higher polymer temperature of the melter-mixer inlet which reduces the sensible thermal energy requirements of the polymer prior to its phase change from the solid state.

Accordingly, the system of the invention provides an oxygen-free, low residence time exposure of the granular reactor resin from the reactor discharge through the final pelleting step. This is especially important for granular reactor resins because of their large surface area and porosity. Thus, potentially, the system can provide a pelleted resin with properties essentially the same as when emerging from the reactor vessel.

(b) Low Thermal Abuse—By virtue of using gear pump technology with its inherently low temperature increase to the polymer, the system operates at polymer temperatures significantly lower if conventional screw extruders would be used for pumping. This further inhibits, along with the absence of oxygen, undesirable changes in resin properties.

(c) Controlled Energy Input—While in its standard operating mode, the system is intended to provide minimum energy input and effect no changes in the polymer, the system does have the capability of imparting excess energy to the polymer in a controlled fashion. Thus, the system has the flexibility to induce controlled changes to the reactor resin, when desired, by controlling the excess energy input in the melter-mixer-gear pump process.

Figure 1:
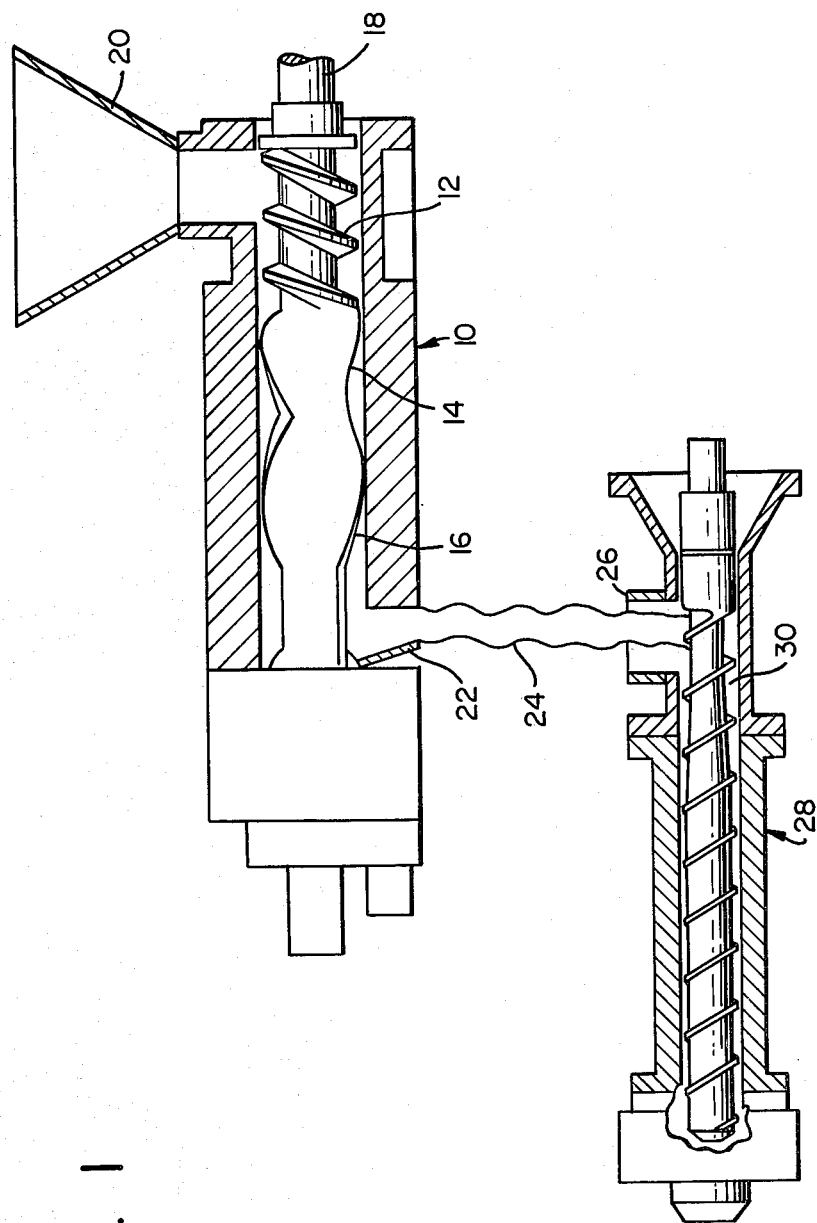
FIG. 1 is an elevational schematic view, partly in section, of conventional apparatus of the art employing the in-line processing of thermoplastic material through a melter/mixer and a conventional extruder.

Referring specifically to the embodiment of melter/mixer-extruder processing in accordance with the prior art as shown in FIG. 1 of the drawings, melter/mixer 10 of the FCM type is employed having successive feed, melter and mixer sections or zones 12, 14 and 16, respectively. The driven screw power inlet means (through shaft 18) provides the energy for either single-screw or twin-screw melter/mixer operation. Gravitational feed hopper means 20 provides the thermoplastic material to be processed in whatever form desired and outlet means 22 passes the melted and mixed material 24 through any of a wide variety of conduit configurations to the inlet 26 of the extruder 28. The extruder may be the single-screw or twin-screw and may involve a multiplicity of stages downstream of the inlet feeding stage 30.

Figure 2:
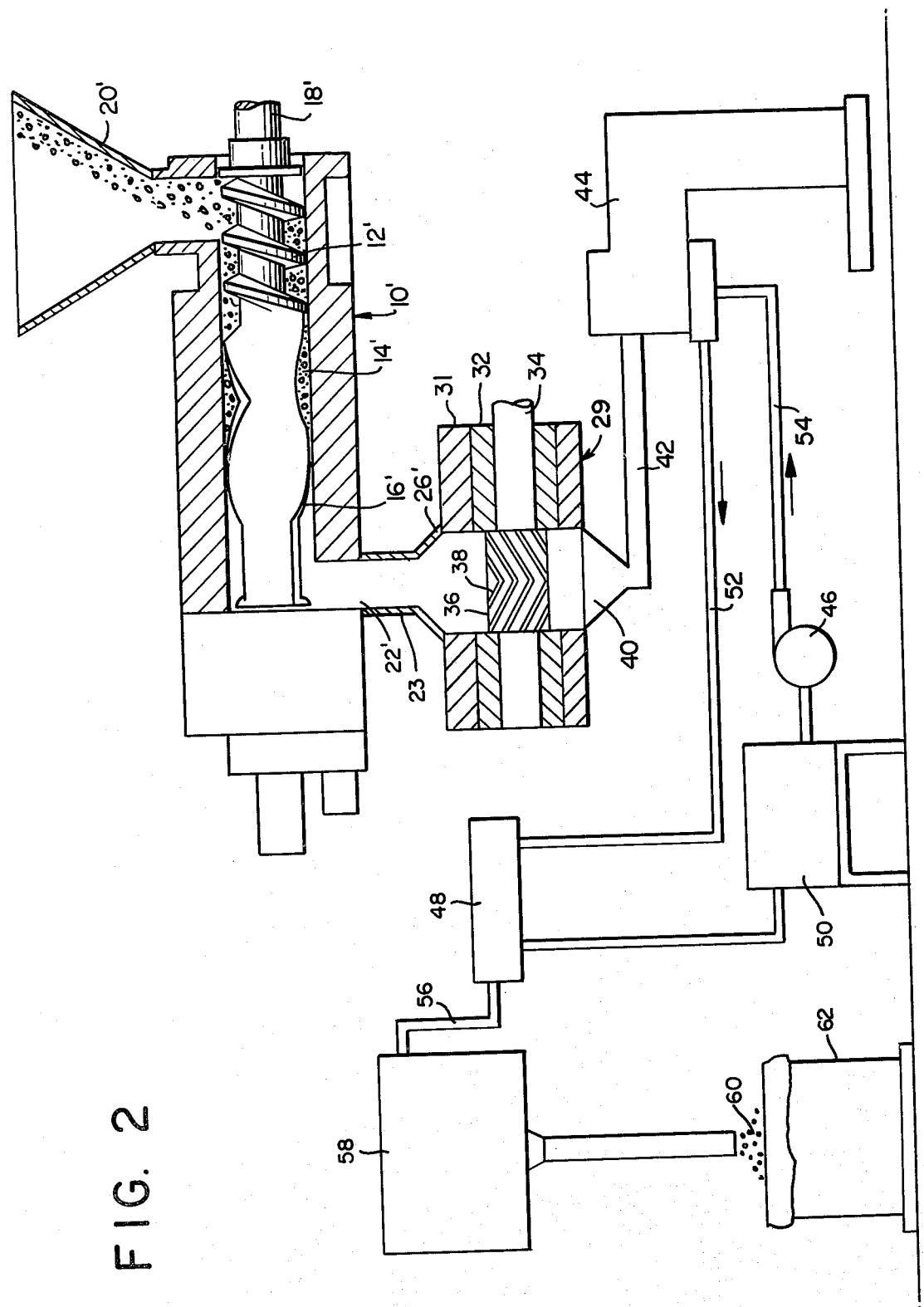
FIG. 2 is an elevational schematic view, partly in section, of apparatus capable of carrying out the process of the present invention.

Referring specifically to FIG. 2 of the drawings and one apparatus embodiment for practicing the process of the present invention, a melter/mixer 10' is provided having substantially the same component elements as employed in the melter/mixer employed in the practice of the prior art processes. Similar elements of FIG. 2 bear the same numerals as those employed in FIG. 1 but have been primed in the showing of FIG. 2.

Figure 4:
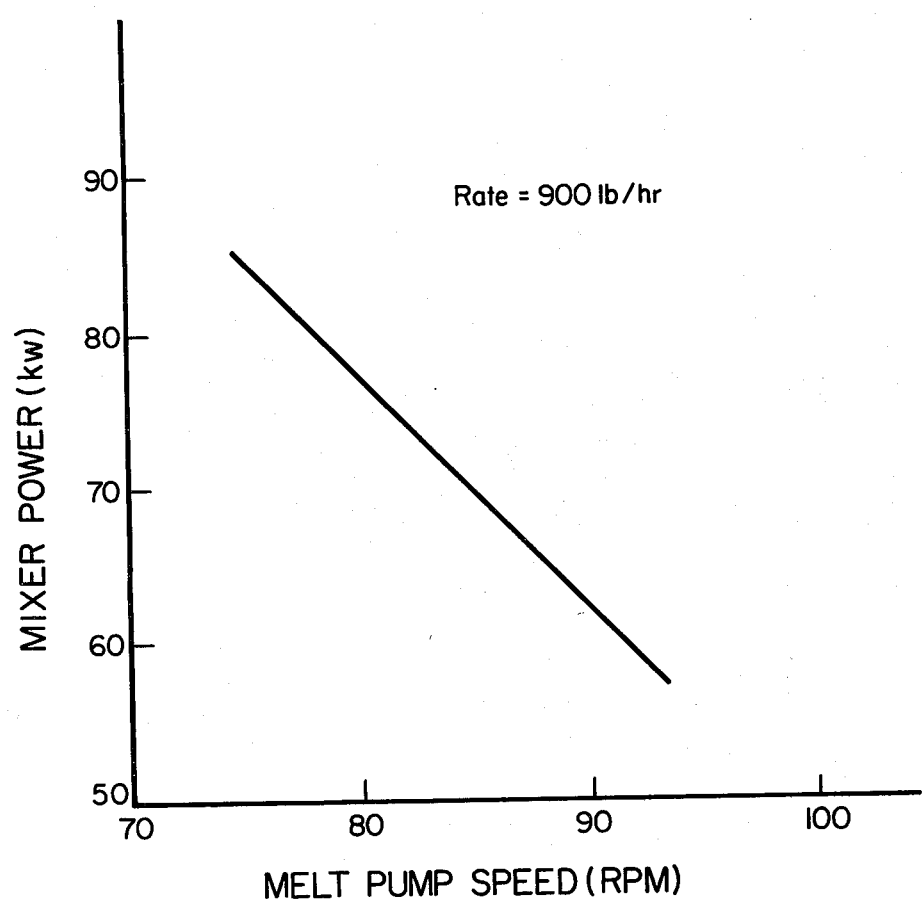
FIG. 4 is a graph showing a proportional relationship, in this case linear, between melt pump (gear pump) speed and melter/mixer power, as encountered in the practice of the process of the invention.

The melted, mixed thermoplastic material passes from exit of the melter/mixer through connecting conduit 23 to inlet conduit 26' of the gear pump 29. The gear pump is of the type described and claimed in U.S. Pat. No. 4,032,391 (see particularly FIGS. 2 and 4 thereof), although the showing of elements in FIG. 2 of the instant drawings gives a very schematic representation of the outer housing member 3, inner bearing sleeve member 32 and rotary drive shaft member 34. The gear member 36 and drive shaft member 34 are not show in section, but are shown in elevational view. The gear member 36 is actually one of a gear pump pair of counter-rotating intermeshing gears having herringbone teeth 38 which intermesh with the teeth of the opposite gear 36 (not shown). As shown in FIGS. 2 and 4 of U.S. Pat. Nos. 4,032,391 and 4,137,023, the outer walls of the gear pump enclosing the gears (not discernible from FIG. 2 of the instant drawings) are curved to contour the outer surface of the gears and are spaced so as to have decreasing hydraulic radius in the downstream direction within the gear pump. In this way, the molten thermoplastic material passing through the upper end of the gear pump forms a pool of material above the pair of gears 36 and passes material around the outer gear pair in the space between the gears and the walls to a point of discharge shown schematically as region 40 in the showing of FIG. 2 of the instant drawings.

The molten thermoplastic material is then passed through conduit 42 to under-water pelleter means 44 which are well known per se to those skilled in the art. At the discharge end of under-water pelleter means 44, the material is water-borne to the drier system through a hydraulic loop containing pump 46, separator screen 48 and surge tank 50. The fluid passing through the loop flows in the direction shown by the arrows in conduits 52 and 54. The screen 48 separates the conveying liquid (water) from the pelletized thermoplastic material which passes through conduit 56 to a centrifugal drier 58 from whence it is discharged at the outlet location 60 into a bulk material box 62 for storage and transportation.

Figure 3:
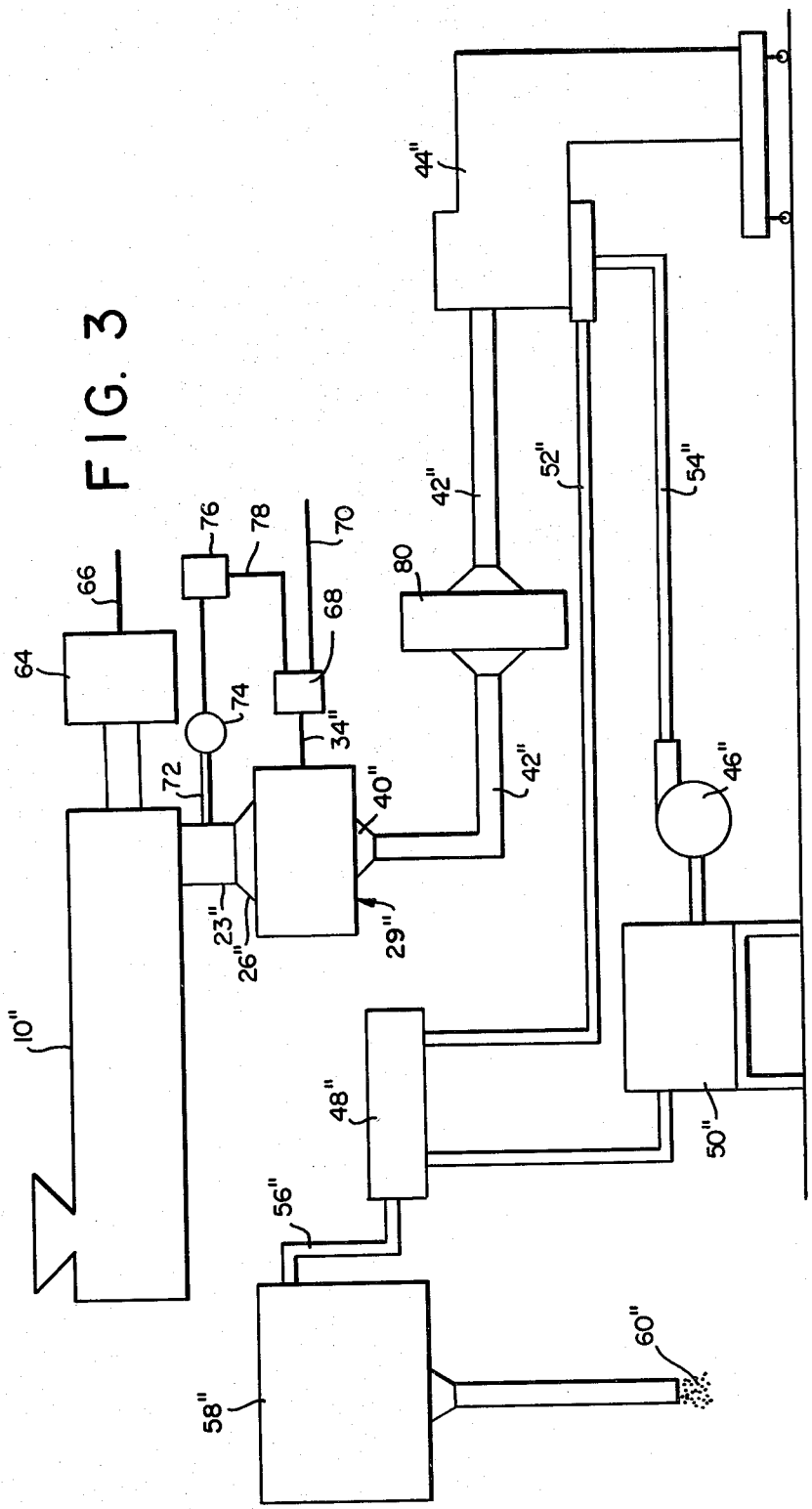
FIG. 3 is a schematic elevational view of apparatus embodying the present invention for the production of pelletized thermoplastic material.

A variation of the embodiment of FIG. 2 of the drawings is shown in FIG. 3 of the drawings. As there shown, a more detailed showing is set forth as to processing in the melter/mixer and gear pump in the way of process control, than that set forth in the showing of FIG. 2.

In the apparatus embodiment of FIG. 3 of the drawings, identical, doubly-primed elements have been assigned to equivalent elements shown in FIG. 2.

The melter-mixer 10" of FIG. 3 is shown shaft-connected to the drive means 64 to which energy is supplied through electrical lines 66. The gear pump 29" is driven through shaft 34" by motor-controller means 68 through which electrical drive power is provided through lines 70. Pressure-tap means 72 is provided in conduit 23" at the pressure interface between the discharge end of the melter/mixer 10" and the inlet end 26" of the gear pump. Pressure-responsive means 74 hydraulically communicates with pressure-tap means 72 and, with electrical control circuitry 76 well known per se to the art, develops electrical feedback energy which is passed through lines 78 to gear pump electrical speed control 68 for modifying the rotational speed of the gear pump 29".

In this aspect of the invention, it has been found that the melt (gear) pump speed (in RPM) can be modified to maintain and control the energy input to the thermoplastic polymer material in the melter/mixer 10". The melter/mixer power (kw) to the molten thermoplastic material will respond as shown graphically in FIG. 4 of the drawings since it has been found that a linear relationship exists between the melt pump speed (as modified) and the melter/mixer input power. Thus, a higher or lower melter/mixer power availability will result in increased or decreased temperature (energy) to the thermoplastic polymer material being passed therethrough. The values of melt (gear) pump speed and melter/mixer power input, and their inter-relationship as shown in FIG. 4 of the drawings, corresponds to a throughput rate of 900 lbs/hr for the polyethylene material there being processed.

It is to be noted that the remaining elements of the embodiment of FIG. 3 are substantially the same as those shown in the embodiment of FIG. 2 with the exception of screenchanger means 80 preferably employed in conduit 42″.

A number of tests have been carried out employing the system of the present invention including a four-inch, twin-screw melter/mixer with a closely coupled melt (gear) pump through a full range of low pressure, low density polyethylene feedstocks which are commercially available. Throughput rates ranged from 900 lbs/hr for 1.0 melt index, granular, low density, low pressure polyethylene material (DGM-1810) to 1200 lbs/hr for 20 melt index granular, low density, low pressure polyethylene material (DGL-2420).

All DGM and DGL material grade designations set forth herein refer to polyethylene resin material grades manufactured and sold by Union Carbide Corporation, Polyolefin Division, New York, N.Y.

COMPARATIVE PUMPING DATA

The following Table I presents operational data for close coupled melter/mixer-gear pump system and a melter/mixer-extruder system where the extruder is rope fed. The melter/mixer is item 10 or 10′ as shown in FIGS. 1 and 2, respectively. The extruder is item 28 with the rope fed polymer appearing as item 24 in FIG. 1. The gear pump is item 29 and close-coupled interface conduit is item 23′/26′ FIG. 2, while the pressure controlled gear pump speed system is items 72, 74 and 76 in FIG. 3. The data is for the same product to allow a direct system comparison for energy input by the melter/mixer and the gear pump or extruder. The reduced total energy input to the product by the melter/mixer-gear pump is evident.

TABLE I

| FCM/LEPSY VS. FCM/EXTRUDER SEI WITH AMBIENT TEMPERATURE FEEDSTOCK | | |
|---|---|---|
| | 4″ FCM/LEPSY | 9″ FCM/EXTRUDER |
| Feedstock | DGM-1820 | DGM-1820 |
| Rate (#/hr) | 900 | 10,000 |
| FCM SEI (Hp-Hr/lb) | 0.084 | 0.082 |
| Pumping SEI (Hp-Hr/lb) | 0.016 | 0.034 |

COMPARATIVE HEATED RESIN DATA

The following Table II presents operational data for each system to indicate the reduced energy input by the melter/mixer for increased polymer temperatures to the melter/mixer inlet. The pilot plant melter/mixer data indicates that for a 17% increase in resin inlet temperature (based on the Kelvin scale) there is a 9% reduction in melter/mixer energy input to the polymer. The production melter/mixer data indicates that for an 8% increase in resin inlet temperature (based on the Kelvin scale) there is a 6% reduction in melter/mixer energy input to the polymer. This data supports the advantage of close coupling the melter/mixer to a polymerization reactor discharge system to utilize the elevated polymer temperature to reduce the melter/mixer energy input to the polymer.

TABLE II

| FCM POWER | | |
|---|---|---|
| EFFECT OF HEATED FEEDSTOCK PILOT PLANT MELTER/MIXER | | |
| FEEDSTOCK | DGM-2030 | DGM-2030 |
| FCM Inlet Temperature | 25° C.(298° K.) | 75° C.(348° K.) |
| FCM Rate (#/Hr) | 1200 | 1200 |
| FCM Power (Kw) | 77 | 70 |
| FCM Discharge Temperature (°C.) | 178 | 189 |
| PRODUCTION MELTER/MIXER | | |
| FEEDSTOCK | DGM-1820 | DGM-1820 |
| FCM Inlet Temperature | 29° C.(302° K.) | 53° C.(326° K.) |
| FCM Rate (#/Hr) | 10,000 | 10,000 |
| FCM Power (Kw) | 615 | 580 |
| FCM Discharge Temperature (°C.) | 168 | 177 |

As employed herein, the following terms have the meanings set forth below:

FCM - a series of melter/mixers made and sold as "Farrel Continuous Mixers" by USM, Beverly, Mass.;

SEI - specific energy input in units of Hp-Hr/lb;

LEPSY - a gear pump low energy pumping system;

DGM - 1820-a grade of granular, low density, low pressure polyethylene of 2MI (melt index);

DGM - 2030-a grade of granular, low density, low pressure polyethylene of 3MI;

DGL - 2420 - grade of granular, low density, low pressure polyethylene of 20 MI;

wherein such grades of polyethylene are trade designations assigned by Union Carbide Corporation which manufactures and sells such materials.

What is claimed is:

1. In the operation of a melter/mixer-gear pump system for the processing of synthetic thermoplastic materials, the improvement which comprises providing close coupling of said melter/mixer to said gear pump arranged in a system and by employing the pressure between the melter/mixer and the gear pump as the parameter controlling, in a proportional relationship, the speed of said gear pump, the energy transmitted to and the consequent temperature of said materials passing through said melter/mixer.

2. In the operation of a melter/mixer-gear pump-pelleter system for the processing of synthetic thermoplastic materials, the improvement which comprises providing said melter/mixer to said gear pump with close coupling and said gear pump to said pelleter, all arranged in an in-line system, and by employing the pressure between the melter/mixer and the gear pump as the parameter controlling, in a proportional relationship, the speed of said gear pump, the energy transmitted to and the consequent temperature of said materials passing through said melter/mixer.

3. The process in accordance with claim 2, wherein said close coupling is effected between the discharge of the polymerization reactor of a system through the melter/mixer and gear pump system.

4. The process in accordance with claim 3, wherein the pressure at the interface between the melter/mixer and the gear pump is employed as the parameter controlling the speed of said gear pump and the consequent energy transmitted to said materials passing through said melter/mixer.

* * * * *

UNITED STATES PATENT AND TRADEMARK OFFICE
CERTIFICATE OF CORRECTION

PATENT NO. : 4,452,750

DATED : Jun. 5, 1984

INVENTOR(S) : R.H. Handwerk et al

It is certified that error appears in the above—identified patent and that said Letters Patent is hereby corrected as shown below:

Column 3, line 12:
"lower if" should be --lower than if--.

Column 6, Table II:
Delete "75° C.(348° K.)" from the second column of FCM Inlet Temperature in which it appears and insert the same in column 3 as the FCM Inlet Temperature.

Signed and Sealed this

Ninth Day of October 1984

[SEAL]

Attest:

GERALD J. MOSSINGHOFF

Attesting Officer

Commissioner of Patents and Trademarks